United States Patent
Creed (10) Patent No.: US 11,134,658 B2
(45) Date of Patent: Oct. 5, 2021

(54) WEARABLE ANIMAL FEEDER

(71) Applicant: HummViewer, LLC, Loveland, CO (US)

(72) Inventor: John Thomas Creed, Loveland, CO (US)

(73) Assignee: HummViewer, LLC, Loveland, CO (US)

(*) Notice: Subject to any disclaimer, the term of this patent is extended or adjusted under 35 U.S.C. 154(b) by 0 days.

(21) Appl. No.: 16/129,630

(22) Filed: Sep. 12, 2018

(65) Prior Publication Data

US 2019/0075761 A1 Mar. 14, 2019

Related U.S. Application Data

(60) Provisional application No. 62/557,496, filed on Sep. 12, 2017.

(51) Int. Cl.
*A01K 39/02* (2006.01)
*A42B 3/22* (2006.01)

(52) U.S. Cl.
CPC ............ *A01K 39/0206* (2013.01); *A42B 3/22* (2013.01)

(58) Field of Classification Search
USPC ........ 119/72, 72.5, 75, 52.2, 57.8; D30/121, D30/132, 133; 2/422, 10, 410, 427, 9, 2/909
See application file for complete search history.

(56) References Cited

U.S. PATENT DOCUMENTS

| | | | |
|---|---|---|---|
| 4,739,905 A * | 4/1988 | Nelson | A42B 3/048 2/422 |
| 4,986,282 A * | 1/1991 | Stackhouse | A61F 9/02 128/857 |
| 5,996,127 A | 12/1999 | Leslie | |
| 7,634,974 B1 * | 12/2009 | Puckett | A01K 39/014 119/61.57 |
| 8,539,910 B1 * | 9/2013 | Hensley | A01K 39/0206 119/72 |
| D819,895 S * | 6/2018 | Smith | D30/125 |
| 2006/0201431 A1 * | 9/2006 | Peterson | A01K 39/0206 119/51.01 |
| 2009/0308321 A1 * | 12/2009 | Szczygiel-Durante | A01K 39/02 119/72 |
| 2011/0239949 A1 * | 10/2011 | Abbott | A01K 39/02 119/72 |

(Continued)

OTHER PUBLICATIONS

HEATSTICK.COM. :~2<:™ Wearable Hummingbird Feeder. Website, http://www.heatstick.com. originally;downloaded Sep. 10, 2018. 6 pages.*

(Continued)

*Primary Examiner* — Andrea M Valenti
(74) *Attorney, Agent, or Firm* — Craig R. Miles; CR Miles P.C.

(57) ABSTRACT

A wearable animal feeder, and methods of making and using such a wearable animal feeder, whereby the wearable animal feeder includes a face shield having opposing face shield upper and lower portions, and opposing face shield front and rear faces; and a reservoir having a reservoir outlet coupled to the face shield lower portion, whereby the reservoir outlet outwardly extends from the face shield front face.

14 Claims, 7 Drawing Sheets

(56) References Cited

U.S. PATENT DOCUMENTS

2012/0272428 A1* 11/2012 Renner ................ A01M 31/06
2/69
2018/0228132 A1* 8/2018 Henehan ............ A01K 39/0206
2018/0295814 A1* 10/2018 Tribble .............. A01K 39/0106

OTHER PUBLICATIONS http://www.heatstick.com/_eYe2eye.htm, :--2<: ™ Wearable Hummingbird Feeder, [retrieved from internet May 5, 2020] link to Youtube video dated Jun. 24, 2008; "George G. with Rufous and Male Anna's".:--2<: ™ Wearable Hummingbird Feeder.*
U.S. Appl. No. 62/557,496, filed Sep. 12, 2017.

* cited by examiner

FIG. 7

WEARABLE ANIMAL FEEDER

This United States Non-Provisional Patent Application claims the benefit of U.S. Provisional Patent Application No. 62/557,496, filed Sep. 12, 2017, hereby incorporated by reference herein.

I. BRIEF SUMMARY OF THE INVENTION

A broad object of a particular embodiment of the invention can be to provide a wearable animal feeder, and methods of making and using such a wearable animal feeder, whereby the wearable animal feeder includes a face shield having opposing face shield upper and lower portions, and opposing face shield front and rear faces; and a reservoir having a reservoir outlet coupled to the face shield lower portion, whereby the reservoir outlet outwardly extends from the face shield front face.

Naturally, further objects of the invention are disclosed throughout other areas of the specification, drawings, and claims.

III. DETAILED DESCRIPTION OF THE INVENTION

Figure 1:
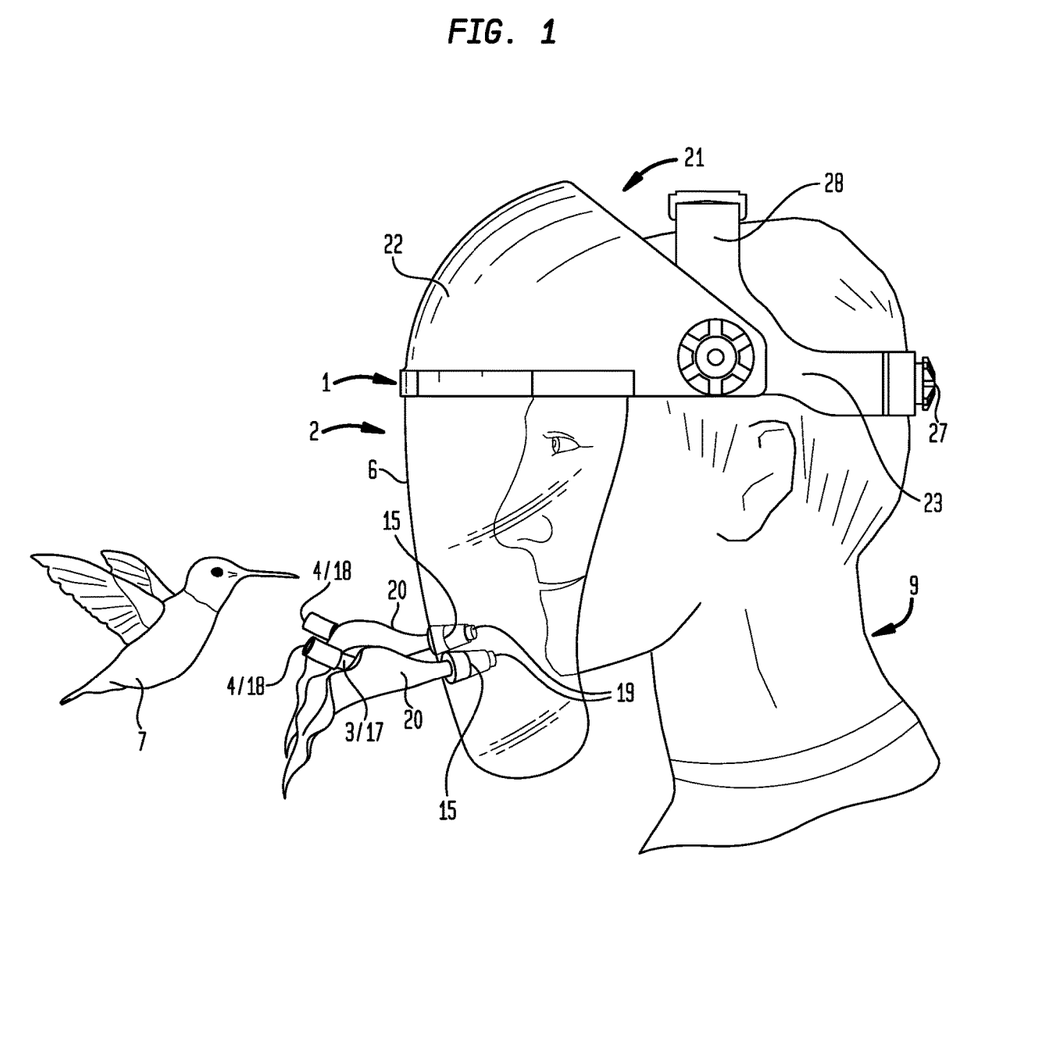
FIG. 1 is an illustration of a method of using a particular embodiment of the wearable animal feeder.
Figure 2:
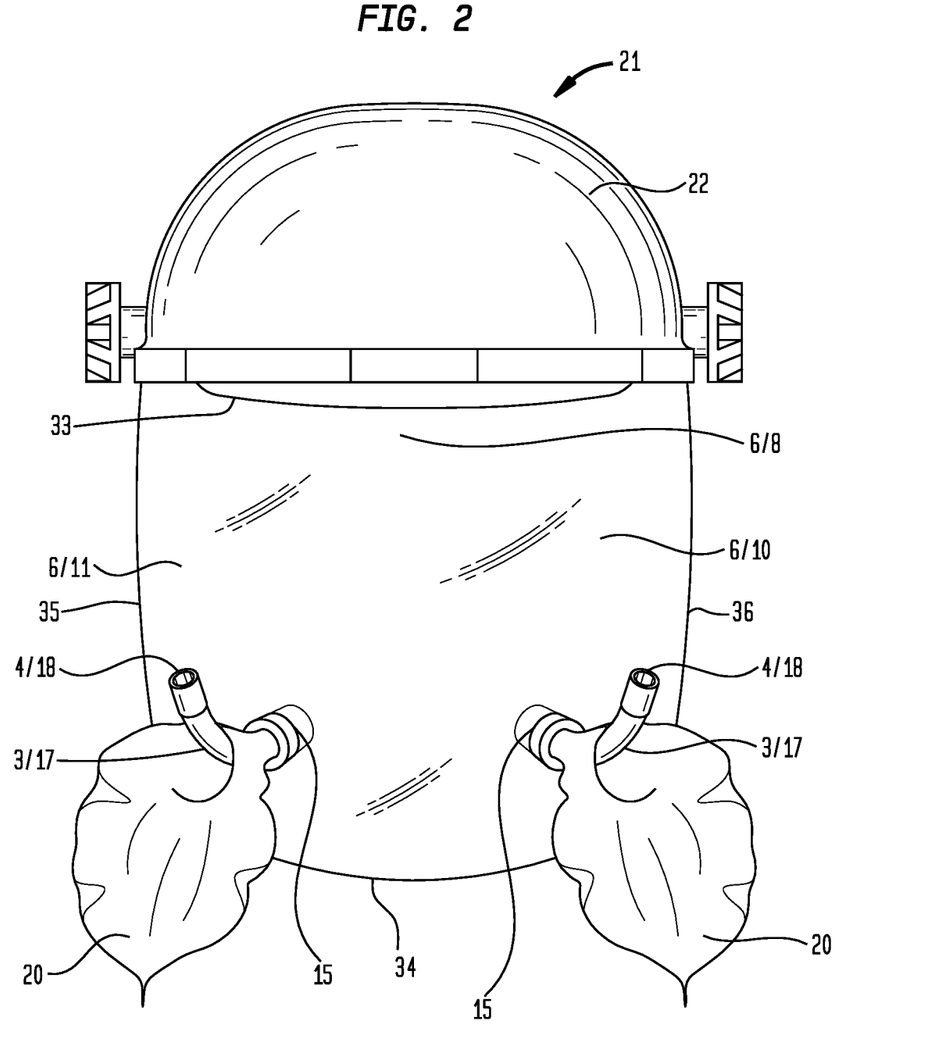
FIG. 2 is a front view of a particular embodiment of the wearable animal feeder.
Figure 3:
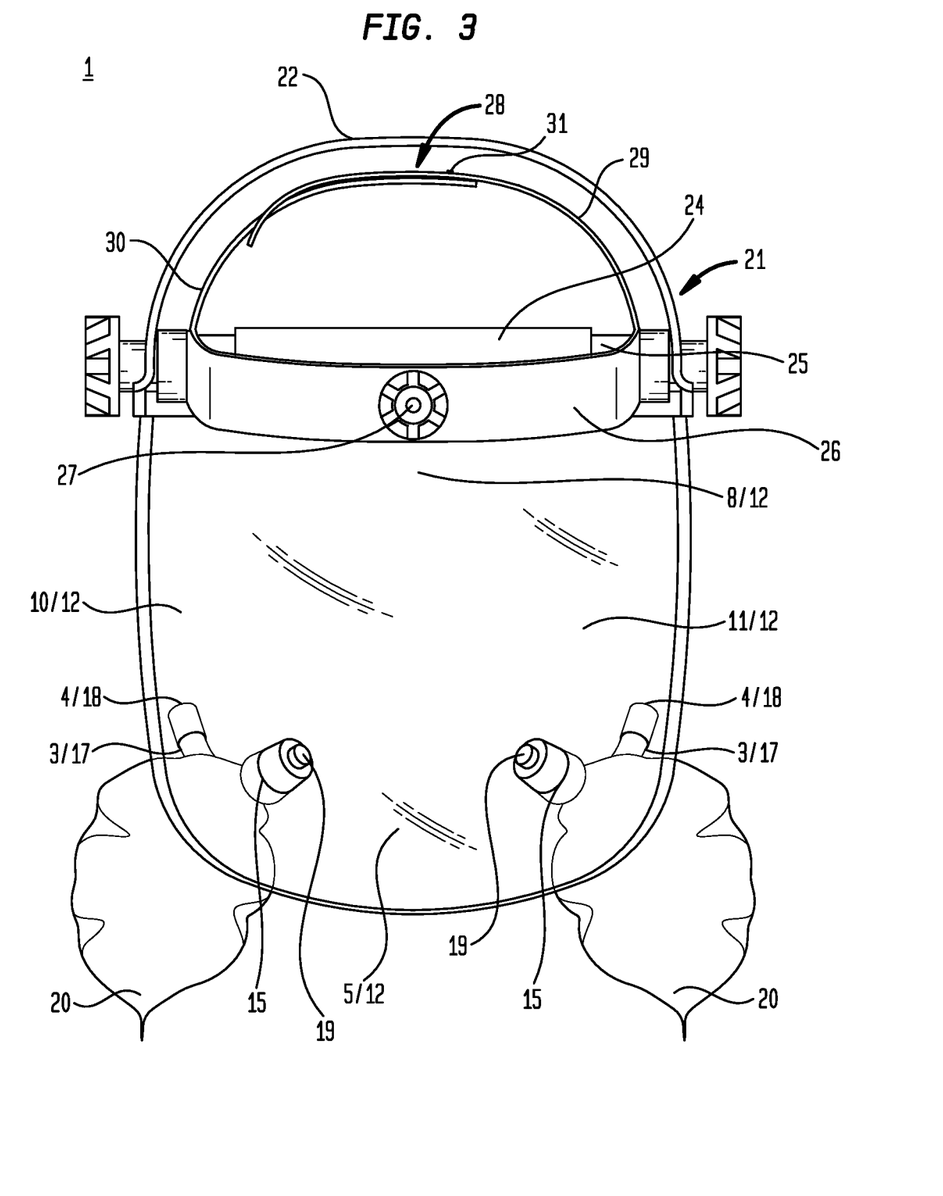
FIG. 3 is a rear view of the particular embodiment of the wearable animal feeder shown in FIG. 2.
Figure 4:
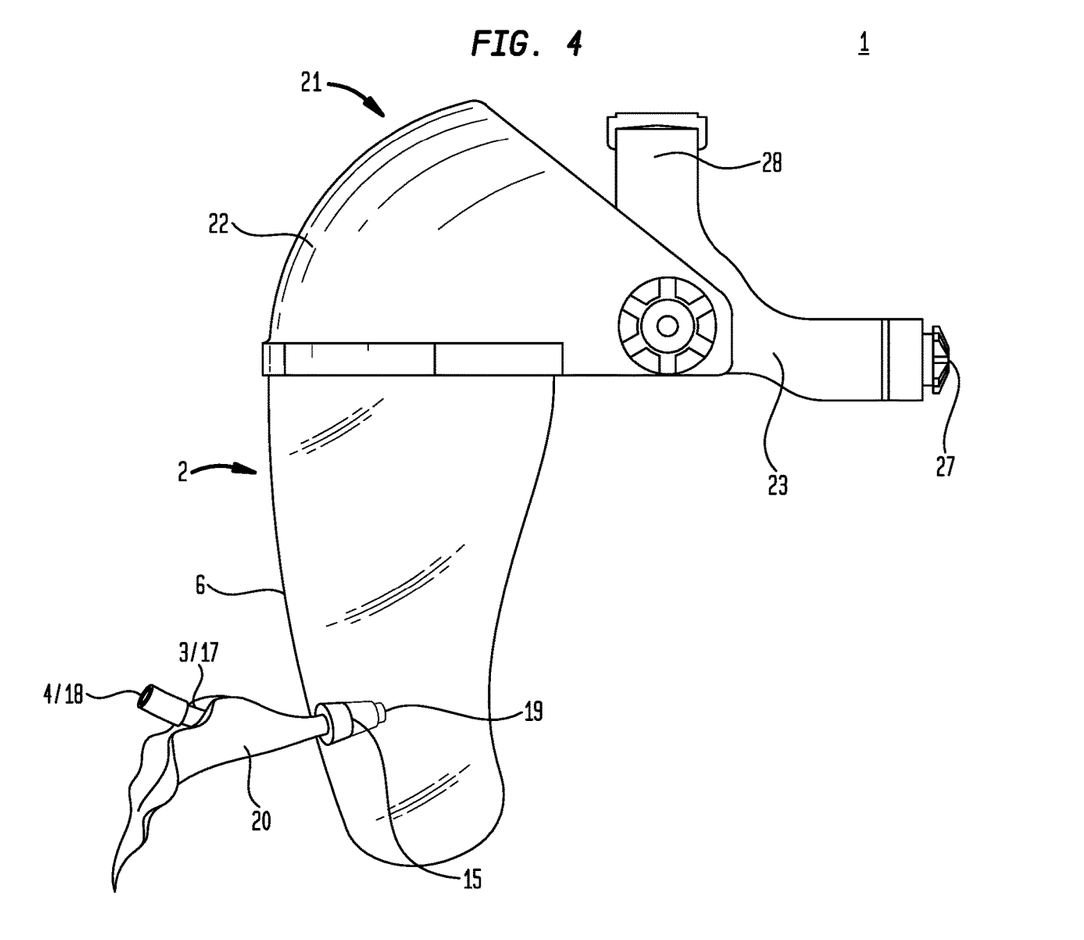
FIG. 4 is a side view of the particular embodiment of the wearable animal feeder shown in FIG. 2.
Figure 5:
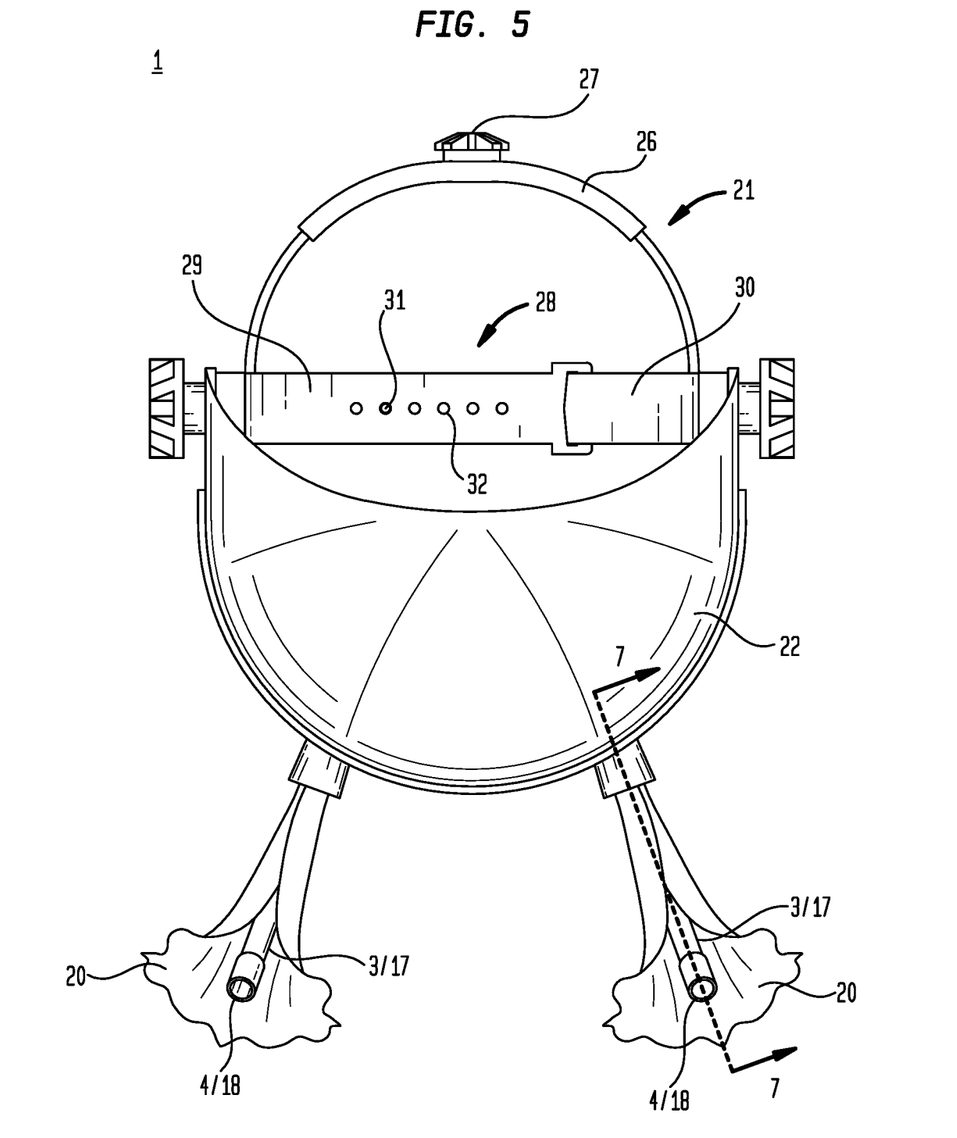
FIG. 5 is a top view of the particular embodiment of the wearable animal feeder shown in FIG. 2.
Figure 6:
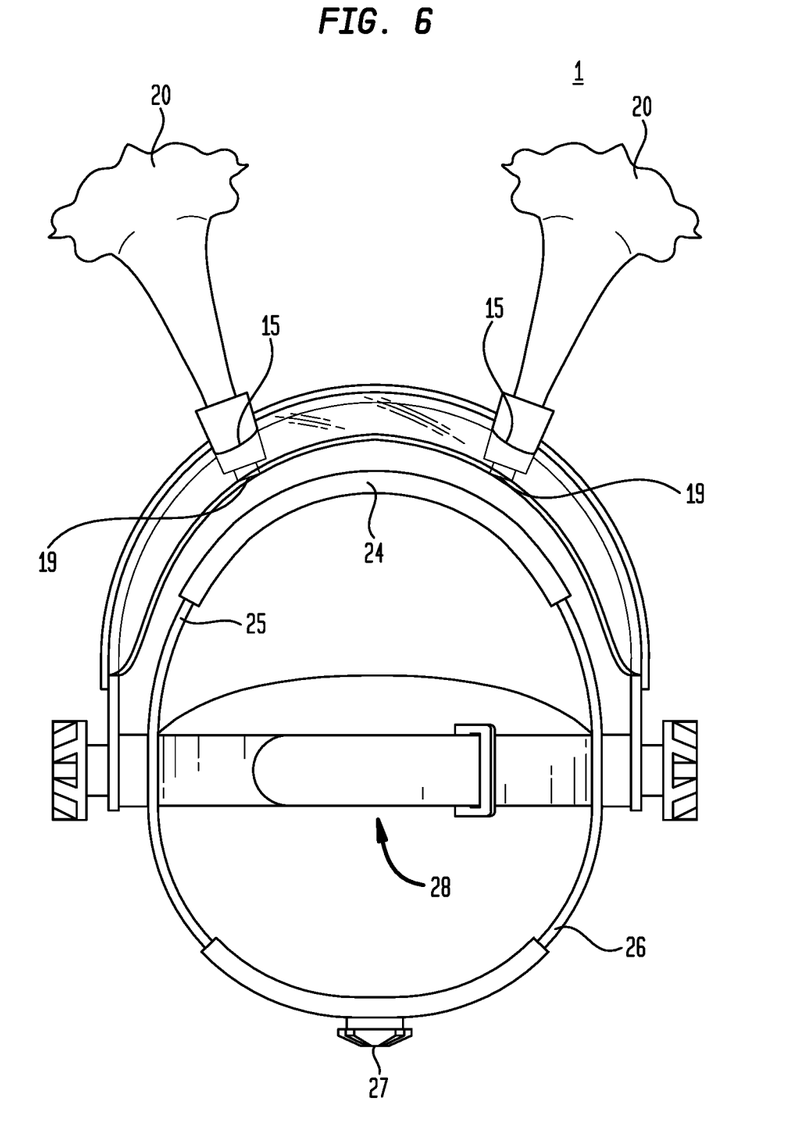
FIG. 6 is a bottom view of the particular embodiment of the wearable animal feeder shown in FIG. 2.
Figure 7:
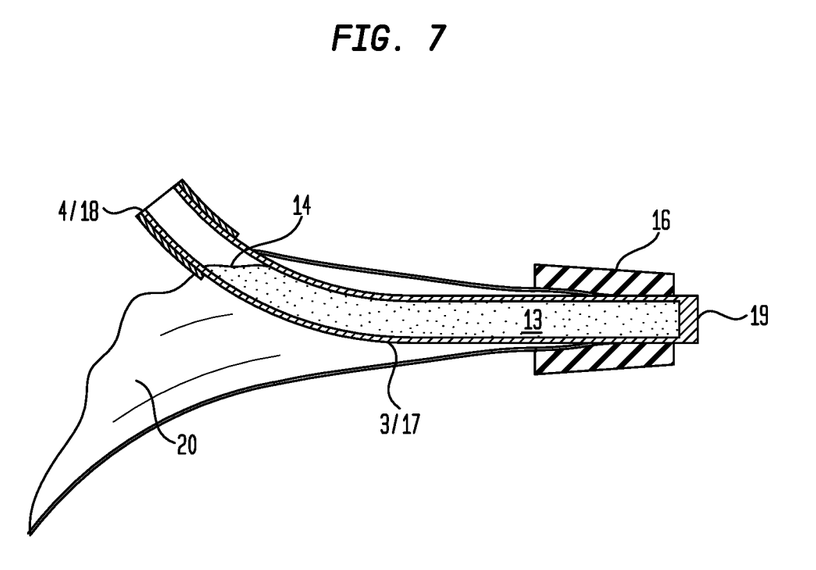
FIG. 7 is a cross sectional view 7-7 of the particular embodiment of a reservoir of the wearable animal feeder shown in FIG. 5.

Now referring primarily to FIG. 1, which illustrates a method of using a particular embodiment of the inventive wearable animal feeder (1) including a face shield (2) and a reservoir (3) having a reservoir outlet (4) coupled to a face shield lower portion (5), whereby the reservoir outlet (4) outwardly extends from a face shield front surface (6). The method of use can include wearing or donning the wearable animal feeder (1) and viewing a feeding animal in close proximity.

The wearable animal feeder (1) may be apt to feed and observe flying animals, such as birds or butterflies. Regarding the former, the wearable animal feeder (1) may be particularly suitable for feeding and viewing one or more hummingbirds (7) from a relatively short distance.

Face Shield

Now referring primarily to FIG. 2 through FIG. 6, the wearable animal feeder (1) includes a face shield (2) having opposing face shield upper and lower portions (8)(5), whereby for the purposes of the instant invention, the term "upper" can refer to the portion of the face shield (2) above the horizontal midline, and the term "lower" can refer to the portion of the face shield (2) below the horizontal midline. When the face shield (2) is worn by a wearer (9), the face shield upper portion (8) will typically dispose in front of the eyes of the wearer (9) to protect said eyes, and the face shield lower portion (5) will typically dispose in front of the mouth of the wearer (9), which may serve to deflect the wearer's breath away from an approaching or feeding animal(s).

The face shield (2) further includes a pair of lateral portions (10)(11), whereby for the purposes of the instant invention, the term "lateral" can refer to a portion of the face shield (2) on either side of the vertical midline. As to particular embodiments, the face shield (2) can include face shield right and left lateral portions (10)(11), whereby the face shield right lateral portion (10) includes the portion of the face shield (2) to the right of the vertical midline, and the face shield left lateral portion (11) includes the portion of the face shield (2) to the left of the vertical midline. The face shield terminates in opposing face shield first (33) and second (34) ends with a horizontal midline halfway between said first and second ends. The face shield terminates in opposing face shield third (35) and fourth (36) ends with a vertical midline halfway between said third and fourth ends. The face shield upper portion (8) being a first portion disposed between said horizontal midline and said face shield first end (33) and the lower portion (5) being a second portion disposed between said horizontal midline and said face shield second end (34). The face shield right lateral portion (10) being a third portion disposed between said vertical midline and said face shield third end (35) and the left lateral portion (11) being a fourth portion disposed between said vertical midline and said face shield fourth end (36).

The face shield (2) further includes opposing face shield front and rear surfaces (6)(12), whereby when in use, the face shield front surface (6) disposes distal from the face of the wearer (9) and the face shield rear surface (12) disposes proximate the face of the wearer (9).

It is noted that when worn, while the face shield rear surface (12) disposes proximate the face of the wearer (9), the face shield rear surface (12) can be spaced apart from the face of the wearer (9) such that the face shield rear surface (12) does not contact the face of the wearer (9). Thus, the face shield (2) can be a free-floating face shield.

To contour to the face of a wearer (9), the face shield (2) can be horizontally arcuate or have a curvature extending in a horizontal direction, meaning the lateral ends can inwardly extend from the central portion of the face shield rear surface (12). Following, in an as-worn orientation, the central portion of the face shield (2) can dispose proximate the central portion of the wearer's face, and the face shield lateral portions (10)(11) can dispose proximate the sides of the wearer's face and/or head.

As to particular embodiments, in addition to having a horizontal curvature, the face shield (2) can also be vertically arcuate or have a curvature extending in a vertical direction, meaning that one or more vertical ends can inwardly extend from the central portion of the face shield rear surface (12). Accordingly, in an as-worn orientation, the central portion of the face shield (2) can dispose proximate the central portion of the wearer's face, the face shield upper portion (8) can inwardly curve to dispose proximate the forehead or the upper portion of the wearer's face, and/or the face shield lower portion (5) can inwardly curve to dispose proximate the chin or the lower portion of the wearer's face.

Concerning the curvature of the face shield (2), said another way, the face shield rear surface (12) can be generally concave, such as horizontally concave and/or vertically concave.

As to particular embodiments, the face shield (2) can be transparent, substantially transparent, or translucent, which can mean that the face shield (2) can be formed from a corresponding transparent, substantially transparent, or translucent material, such as any appropriate relatively rigid plastic material.

As to particular embodiments, the face shield (2) can be entirely transparent, substantially transparent, or translucent.

As to other particular embodiments, at least a portion of the face shield upper portion (8) can be partially transparent, substantially transparent, or translucent, such that in use, the transparent, substantially transparent, or translucent portion disposes proximate the eyes of the wearer (9) to protect said eyes while also allowing the wearer (9) to see through the face shield upper portion (8). Concerning the remainder of the face shield (2), as to particular embodiments, a visual attractant can be coupled to the face shield front and/or rear surface (6)(12) to aid in attracting a target animal(s) to the wearable animal feeder (1). As but one non-limiting example, an image of one or more flowers can be coupled to the face shield front and/or rear surface (6)(12), such as by adhesion, to attract hummingbirds (7), whereby the type and coloring of the flower(s) may be specifically chosen to aid in the attraction. Regarding the latter, red or yellow flowers may be particularly suitable for this purpose.

Reservoir

Now referring primarily to FIG. 2 through FIG. 5, and FIG. 7, the wearable animal feeder (1) further includes a reservoir (3) having a reservoir outlet (4) which communicates with a reservoir interior space (13).

The reservoir (3) can be configured to contain an attractant which can function to attract a target animal(s). As to particular embodiments, the attractant can be a consumable which can attract the target animal(s). As to particular embodiments, the attractant can be a consumable fluid (14), such as a liquid, which can attract the target animal(s). Of course, the target animal(s) can access the consumable fluid (14) within the reservoir interior space (13) via the reservoir outlet (4).

As but one non-limiting example, the consumable fluid (14) can be nectar or a nectar-imitating fluid, such as a sugar and water solution (for example, one part sugar and three parts water). Thus, the consumable fluid (14) can provide a taste and/or scent attractant. Further, the consumable fluid (14) can be colored, for example by the addition of a red colorant, to provide a visual attractant.

In addition, the reservoir outlet (4) can include a visual attractant. For example, the reservoir outlet (4) can be bounded, either partially or entirely, by an attractive color, for example red or yellow.

Now referring primarily to FIG. 2 through FIG. 6, the reservoir outlet (4) can be coupled to or dispose proximate the face shield lower portion (5). As to particular embodiments, at least a portion of the reservoir (3) can also be coupled to or dispose proximate the face shield lower portion (5). Accordingly, when in use, the reservoir outlet (4) disposes below, under, or underneath the eyes of the wearer (9). Following, when feeding from the reservoir outlet (4), a target animal is correspondingly positioned below, under, or underneath the eyes of the wearer (9).

It is herein noted that the disposition of the reservoir outlet (4) proximate the face shield lower portion (5) can differentiate the instant wearable animal feeder (1) from the eYe2eYe wearable hummingbird feeder, which is configured to position a hummingbird right between the eyes, about an inch above the nose, for eye-to-eye viewing.

Again referring primarily to FIG. 2 through FIG. 6, the reservoir outlet (4) can also be coupled to or dispose proximate a face shield lateral portion (10)(11). In this way, the reservoir outlet (4) is not coupled to or disposed proximate the vertical midline. As to particular embodiments, at least a portion of the reservoir (3) can also be coupled to or dispose proximate a face shield lateral portion (10)(11).

Correspondingly, when in use, the reservoir outlet (4) does not centrally dispose between the eyes of the wearer (9). Following, when feeding from the reservoir outlet (4), a target animal is not centrally positioned between the eyes of the wearer (9).

It is herein noted that the disposition of the reservoir outlet (4) proximate a face shield lateral portion (10)(11) can differentiate the instant wearable animal feeder (1) from the eYe2eYe wearable hummingbird feeder, whereby it is herein contemplated that positioning a hummingbird right between the eyes for eye-to-eye viewing may be disadvantageous, as the wearer's eyes may not be able to optimally focus on a hummingbird in this position. In fact, if the hummingbird is both centrally positioned between the eyes and relatively close to the eyes, the wearer's eyes may cross when viewing the hummingbird, thus compromising or detracting from the view of the hummingbird.

Again referring primarily to FIG. 2 through FIG. 6, the reservoir outlet (4) can also outwardly extend from the face shield front surface (6) to dispose the reservoir outlet (4) and correspondingly, a feeding target animal, a distance from the face shield front surface (6).

Concerning the outward extension, the distance from the face shield front surface (6) should be sufficient to dispose the reservoir outlet (4) and, correspondingly, the feeding target animal, at a preferable position within the line of sight of the wearer (9), meaning neither too close to the wearer's eyes nor too far from the wearer's eyes to compromise or detract from the view of the animal. For example, if the feeding target animal is too close to the wearer's eyes, the animal may appear blurry, thereby detracting from the view of the animal. Conversely, if the feeding target animal is too far from the wearer's eyes, the wearer (9) may not get the desired up-close, detailed view of the animal.

Following, as to particular embodiments, the reservoir outlet (4) can outwardly extend from the face shield front surface (6) by a distance of at least about 1.5 inches (about 38.1 mm).

As to particular embodiments, the reservoir outlet (4) can outwardly extend from the face shield front surface (6) by a distance of less than about 6 inches (about 152.4 mm).

As to particular embodiments, the reservoir outlet (4) can outwardly extend from the face shield front surface (6) by a distance between about 1.5 inches (about 38.1 mm) and less than about 6 inches (about 152.4 mm).

It is herein noted that the distance of the outwardly extending reservoir outlet (4) provides the instant wearable animal feeder (1) with an advantage over the eYe2eYe wearable hummingbird feeder, which is configured to position a hummingbird very close to the wearer's eyes, whereby it is herein contemplated that the wearer's eyes may not be able to optimally focus on a hummingbird positioned at this distance.

Again referring primarily to FIG. 2 through FIG. 6, the reservoir outlet (4) and correspondingly, the reservoir (3) can be coupled to the face shield (2) in a numerous and wide variety of ways, which can include attachment means such as mechanical fastener(s) and/or adhesive(s).

As to particular embodiments, the reservoir (3) can be removably coupled to the face shield (2), whereby the removable coupling may to useful for filling or cleaning the reservoir (3).

As to particular embodiments, the face shield (2) can include an aperture element (15) disposed in the face shield (2), for example proximate a face shield lower and lateral portion (5)(10)(11), whereby the aperture element (15) communicates between the face shield front and rear surfaces (6)(12). Accordingly, the aperture element (15) can provide a pass-through between the face shield front and rear surfaces (6)(12), whereby the aperture element (15) can be configured to couple the reservoir (3) to the face shield (2).

As to particular embodiments, the reservoir (3) can be received within the aperture element (15) to couple the reservoir (3) to the face shield (2), whereby upon receipt, at least the reservoir outlet (4) outwardly extends from the face shield front surface (6).

As to particular embodiments, the reservoir (3) can be removably received within the aperture element (15) to removably couple the reservoir (3) to the face shield (2). As but one illustrative example, the reservoir (3) can frictionally engage, whether directly or indirectly, with the aperture element (15) to removably couple the reservoir (3) to the face shield (2).

For direct frictional engagement, an outer surface of the reservoir (3) can engage with the portion of the face shield (2) which defines the aperture element (15). For indirect frictional engagement, a layer (16), such as a resiliently compressible layer, can be disposed between the outer surface of the reservoir (3) and the portion of the face shield (2) which defines the aperture element (15) to provide snug, but removable, engagement of the two components.

Now referring primarily to FIG. 2 through FIG. 7, as to particular embodiments, the reservoir (3) can be configured as a conduit (17) capable of passing through and engaging with the aperture element (15) for coupling or removable coupling to the face shield (2). As to these particular embodiments, the reservoir outlet (4) can be provided by an open first end (18) of the conduit (17) which allows access to the conduit interior space (13). In line with the above description of the reservoir outlet (4), the open first end (18) of the conduit (17) can outwardly extend from the face shield front surface (6).

As to particular embodiments, a valve can be coupled to the open first end (18) of the conduit (17) to permit access to the conduit interior space (13) from the external environment, for example by a hummingbird (7), while preventing the consumable fluid (14) from freely egressing from the open first end (18).

Again referring primarily to FIG. 2 through FIG. 7, as to particular embodiments, a second end (19) of the conduit (17) can outwardly extend from the face shield rear surface (12). Further, the second end (19) of the conduit (17) can be configured as a closed end, thereby precluding the consumable fluid (14) contained within the conduit interior space (13) from egressing from the second end (19). It is herein contemplated that the second end (19) of the conduit (17) can either be integrally closed or a closing member, such as an end cap or plug, can be coupled to the second end (19) to effectively impede passage of the consumable fluid (14) through the second end (19).

As to particular embodiments, in addition to outwardly extending from the face shield front surface (6), a portion of the conduit (17) and the open first end (18) can upwardly extend from the location of the aperture element (15) within the face shield (2).

Again referring primarily to FIG. 2 through FIG. 7, the wearable animal feeder (1) can, but need not necessarily, further include a visual attractant (20) coupled to the reservoir (3) or conduit (17). For example, a visual attractant (20) configured to mimic a flower can at least partially surround the reservoir (3) or conduit (17).

Headgear Assembly

Now referring primarily to FIG. 2 through FIG. 6, the wearable animal feeder (1) can further include a headgear assembly (21) coupled to the face shield (2), whereby the headgear assembly (21) may function to couple the face shield (2) to the head of a wearer (9).

The headgear assembly (21) can include a crown member (22) which can couple, directly couple, or connect to the face shield (2) by any suitable means, such as mechanical fasteners. In particular, the face shield upper portion (8) can attached to the crown member (22). Following, when in use, the crown portion (22) can cover a front upper portion of the wearer's head.

As to particular embodiments, the crown member (22) can be formed from any appropriate relatively rigid plastic material. As to particular embodiments, at least a portion of the crown member (22) can be configured to act as a visual attractant. For example, at least a portion of the crown member (22) can be colored red or yellow, or include an image of one or more flowers.

Further, the headgear assembly (21) can include a headband (23) pivotally coupled or connected to the crown member (22) and correspondingly, the face shield (2), whereby the headband (23) can be configured to laterally extend about an upper portion of the head of the wearer (9). As to particular embodiments, the headband (23) can include (i) a headband front portion (25) configured to couple to or engage with the front portion of the upper portion of the wearer's head and (ii) a headband rear portion (26) configured to couple to or engage with the rear portion of the upper portion of the wearer's head.

As to particular embodiments, the headband (23) can include a compressible layer (24), such as padding or foam, on at least a portion of the inner surface to increase the comfort of the headband (23) when worn by a wearer (9).

As to particular embodiments, the headband (23) can have an adjustable circumference or length. For example, the circumference or length of the headband (23) can be adjusted by an adjuster (27), such as a ratcheting mechanism. As to particular embodiments, the ratcheting mechanism can be incorporated into the headband rear portion (26).

As to particular embodiments, the headband (23) can further include an overhead strap (28) configured to extend about the top of the head of the wearer (9). As to particular embodiments, the overhead strap (28) can have an adjustable length. For example, the overhead strap (28) can include first and second overhead strap portions (29)(30) which can overlayingly engage and secure together via a snap mechanism. Following, one of the overhead strap portions (29)(30) can include a snap (31) and the other overhead strap portion (29)(30) can include a plurality of spaced apart openings (32). Thus, the length of the overhead strap (28) can be adjusted based upon which opening (32) the snap (31) engages with.

More than One Reservoir

Now referring primarily to FIG. 2 through FIG. 6, as to particular embodiments, the wearable animal feeder (1) can further include a plurality of reservoirs (3) and following, a plurality of corresponding reservoir outlets (4), coupled to the face shield (2). As but one illustrative example, a particular embodiment of the wearable animal feeder (1) can include two reservoirs (3) and thus, two corresponding reservoir outlets (4), whereby both can be coupled to the face shield lower portion (5) and/or coupled to a face shield lateral portion (10)(11).

Method of Making

Now regarding production, a method of making a particular embodiment of the wearable animal feeder (1) can include providing a face shield (2) having opposing face shield upper and lower portions (8)(5), and opposing face shield front and rear surfaces (6)(12); and coupling a reservoir outlet (4) of a reservoir (3) to the face shield lower portion (5) such that the reservoir outlet (4) outwardly extends from the face shield front surface (6).

The method of making particular embodiments of the wearable animal feeder (1) can further include providing additional components of the wearable animal feeder (1) as described above and in the claims.

As can be easily understood from the foregoing, the basic concepts of the present invention may be embodied in a variety of ways. The invention involves numerous and varied embodiments of a wearable animal feeder and methods for making and using such a wearable animal feeder.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or a method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupler" and even a "means for coupling." Such alternative terms for each element or step are to be understood to be explicitly included in the description.

In addition, as to each term used, it should be understood that unless its utilization in this application is inconsistent with such interpretation, common dictionary definitions should be understood to be included in the description for each term as contained in Merriam-Webster's Dictionary, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about", it will be understood that the particular value forms another embodiment. The term "about" generally refers to a range of numeric values that one of skill in the art would consider equivalent to the recited numeric value or having the same function or result. Similarly, the antecedent "substantially" or "generally" means largely, but not wholly, the same form, manner or degree and the particular element will have a range of configurations as a person of ordinary skill in the art would consider as having the same function or result. When a particular element is expressed as an approximation by use of the antecedent "substantially" or "generally", it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Thus, the applicant should be understood to claim at least: (i) each embodiment of the wearable animal feeder herein disclosed and described, (ii) the related methods disclosed and described, (iii) similar, equivalent, and even implicit variations of each of these apparatuses and methods, (iv) those alternative embodiments which accomplish each of the functions shown, disclosed, or described, (v) those alternative designs and methods which accomplish each of the functions shown as are implicit to accomplish that which is disclosed and described, (vi) each feature, component, and step shown as separate and independent inventions, (vii) the applications enhanced by the various systems or components disclosed, (viii) the resulting products produced by such systems or components, (ix) methods and apparatuses substantially as described hereinbefore and with reference to any of the accompanying examples, and (x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification are further intended to describe the metes and bounds of a limited number of embodiments of the invention and are not to be construed as the broadest embodiment of the invention or a complete listing of embodiments of the invention that may be claimed. The applicant does not waive any right to develop further claims based upon the description set forth above or in the drawings as a part of any continuation, division, continuation-in-part, or similar application.

The invention claimed is:

1. A wearable animal feeder, comprising:
    a face shield having opposing face shield front and rear surfaces;
    said face shield terminating in opposing face shield first and second ends with a horizontal midline halfway between said first and second ends;
    said face shield terminating in opposing face shield third and fourth ends with a vertical midline halfway between said third and fourth ends;
    said face shield having a face shield first portion disposed between said horizontal midline and said face shield first end, said face shield first portion configured to dispose in front of the eyes of a wearer when in use;
    said face shield having a face shield second portion disposed between said horizontal midline and said face shield second end, said face shield second portion configured to dispose in front of the mouth of a wearer when in use;
    said face shield having a face shield third portion disposed between said vertical midline and said face shield third end;
    said face shield having a face shield fourth portion disposed between said vertical midline and said face shield fourth end;
    at least two reservoirs directly connected to said face shield second portion, one of said reservoirs directly connected to said face shield third portion and one of said reservoirs directly connected to said face shield fourth portion; and
    at least two aperture elements disposed in said face shield, each said aperture element communicating between said face shield front and rear surfaces;
    wherein each said reservoir is received within one of said aperture elements to frictionally couple said reservoir to said face shield;
    wherein each said reservoir comprises (i) an open first end which provides a reservoir outlet, and (ii) a closed second end;
    wherein said open first end outwardly extends from said face shield front surface toward said horizontal midline to dispose (i) said open first end nearer said horizontal midline than said face shield second end, and (ii) said closed second end nearer said face shield second end than said horizontal midline; and
    wherein each said reservoir consists solely of an elongated tube of uniform diameter extending from said open first end up to and including said closed second end.

2. The wearable animal feeder of claim 1, wherein each said reservoir outlet is at least partially bounded by an attractant capable of attracting a target animal.

3. The wearable animal feeder of claim 1, wherein each said reservoir outlet is coupled to a face shield lateral portion.

4. The wearable animal feeder of claim 1, wherein each said reservoir is removably coupled to said face shield.

5. The wearable animal feeder of claim 1, wherein each said reservoir is removably received within said aperture element to removably couple said reservoir to said face shield.

6. The wearable animal feeder of claim 1, wherein each said reservoir is configured as a conduit.

7. The wearable animal feeder of claim 6, further comprising a visual attractant coupled to each said conduit.

8. The wearable animal feeder of claim 1, further comprising a headgear assembly coupled to said face shield.

9. The wearable animal feeder of claim 8, wherein said headgear assembly comprises a crown member coupled to said face shield.

10. The wearable animal feeder of claim 9, wherein said headgear assembly further comprises a headband coupled to said crown member.

11. The wearable animal feeder of claim 10, wherein said headband is pivotally coupled to said crown member.

12. The wearable animal feeder of claim 10, wherein said headband comprises an adjustable circumference.

13. The wearable animal feeder of claim 1, wherein each said reservoir outlet outwardly extends from said face shield front surface by a distance of at least about 1.5 inches.

14. The wearable animal feeder of claim 1, wherein each said reservoir outlet outwardly extends from said face shield front surface by a distance of between about 1.5 inches and about 6 inches.

* * * * *